United States Patent [19]

Naito et al.

[11] Patent Number: 4,997,236

[45] Date of Patent: Mar. 5, 1991

[54] ANTISKID BRAKE CONTROL SYSTEM

[75] Inventors: Yasuo Naito; Akihiko Mori; Yasuhiro Yamada, all of Himeji, Japan

[73] Assignee: Mitsubishi Denki Kabushiki Kaisha, Tokyo, Japan

[21] Appl. No.: 520,422

[22] Filed: May 8, 1990

[30] Foreign Application Priority Data

May 24, 1989 [JP] Japan .................................. 1-131817

[51] Int. Cl.$^5$ ............................. B60T 8/70; B60T 8/64
[52] U.S. Cl. .................................... 303/106; 303/100; 303/103; 303/110; 364/426.02
[58] Field of Search ............... 303/106, 105, 103, 100, 303/102, 107, 108, 109, 110; 188/181 A, 181 R; 364/426.02

[56] References Cited

U.S. PATENT DOCUMENTS 4,054,328 10/1977 Leiber et al. ...................... 303/103
4,681,374 7/1987 Nakamura et al. ................ 303/106

Primary Examiner—Douglas C. Butler
Attorney, Agent, or Firm—Sughrue, Mion, Zinn, Macpeak and Seas

[57] ABSTRACT

An antiskid brake control system comprises: braking force adjusting device for decreasing and increasing a braking force to be applied to at least one wheel so that the wheel is prevented from being locked at the time of braking a vehicle with the braked wheel; wheel speed detecting device for detecting the speed of the wheel to which the braking force is applied; wheel deceleration detecting device for detecting acceleration/deceleration of the wheel to output information on the deceleration of the wheel; decreasing amount calculation device for receiving the information on the vehicle deceleration, and for outputting a signal indicative of a decrease in the braking force to the braking force adjusting device when detecting a tendency of the wheel to lock wherein the wheel deceleration exceeds a given value; first deceleration period measurement device for measuring the period where the pressure-decreasing signal is being outputted, and for outputting information on the first deceleration period; maximum deceleration detecting device for detecting the maximum value of the wheel deceleration; second deceleration period measurement device for starting to measure the lapse of a period from the time when the maximum value of the wheel deceleration has been detected, and for outputting information on the second deceleration period; and increasing amount calculation device for finding a control amount required to increase the braking force, based on the information on the first deceleration period and on the information on the second deceleration period, and for outputting the required control amount to the braking force adjusting device.

1 Claim, 5 Drawing Sheets

ANTISKID BRAKE CONTROL SYSTEM

BACKGROUND OF THE INVENTION

1. Field of the Invention

The present invention relates to an antiskid brake control system wherein when there is a tendency of a vehicle wheel to lock at the time of braking the vehicle, the action of an actuator causes a brake pressure to decrease, wherein when the revolution of the wheel has been restored due to such pressure reduction, the brake pressure is revived, and wherein these operations are repeated to prevent the wheel from coming into its lock state.

2. Discussion of Background

FIG. 5 is characteristic curves of a conventional antiskid brake control system as disclosed in e.g. Japanese Examined Patent Publication No. 20503/1984. In FIG. 5, reference numeral 101 designates vehicle wheel speed. Reference numeral 102 designates vehicle speed. Reference numeral 103 designates vehicle wheel deceleration in the vehicle wheel speed 101. Reference numeral 104 designates a brake pressure.

The operation of the conventional antiskid brake control system will be described. When the vehicle wheel deceleration 103 exceeds given value $\alpha 1$, the brake pressure 104 is decreased. When the vehicle wheel deceleration 103 is lowered to not higher than the given value $\alpha 1$ due to the decrease in the brake pressure, decreasing the brake pressure 104 is stopped, and the brake pressure 104 is slightly increased to compensate for a lag in operation of the brake system.

Next, when acceleration is produced at the wheel and the wheel acceleration has achieved not lower than given value $\alpha 2$, the brake pressure is held constant.

Next, when the wheel deceleration 103 lowers to not higher than the given value $\alpha 2$, the brake pressure 104 is increased.

The conventional antiskid brake control system works as forwards; when it detects a tendency of a vehicle wheel to lock at the time of braking, the brake pressure is decreased. When the vehicle wheel deceleration is lowered to not higher than the given first value, decreasing the brake pressure is stopped, and the brake pressure is increased until the vehicle acceleration exceeds the given second value. This allows a lag in operation of the brake system to be compensated. However, vehicle wheel deceleration characteristics greatly change depending on load conditions applied to the braked wheel, such as coefficient of friction between the road and the wheel, or on the gear position of a transmission.

Under such circumstances, the compensation for a lag in operation of the brake system becomes inadequate, and the antiskid brake control system gets into such state that the brake pressure is increased too much, or is decreased too much.

This creates problems in that the time required to obtain a proper value of braking force is prolonged, and the efficiency of the braking operation is significantly decreased, deteriorating a sense of brake operation.

SUMMARY OF THE INVENTION

It is an object of the present invention to resolve such problems and to provide a new and improved antiskid brake control system capable of finding an amount required to compensate for a lag in operation of a brake system based on the amount of a decrease in the brake pressure, and of modifying the amount of the compensation based on the information on vehicle wheel deceleration, thereby improving braking efficiency.

The forgoing and other objects of the present invention have been attained by providing an antiskid brake control system comprising braking force adjusting means for decreasing and increasing a braking force to be applied to at least one wheel so that the wheel is prevented from being locked at the time of braking a vehicle with the braked wheel; wheel speed detecting means for detecting the speed of the wheel to which the braking force is applied; wheel deceleration detecting means for detecting acceleration/deceleration of the wheel to output information on the deceleration of the wheel; decreasing amount calculation means for receiving the information on the vehicle deceleration, and for outputting a signal indicative of a decrease in the braking force to the braking force adjusting means when detecting a tendency of the wheel to lock wherein the wheel deceleration exceeds a given value; first deceleration period measurement means for measuring the period where the pressure-decreasing signal is being outputted, and for outputting information on the first deceleration period; maximum deceleration detecting means for detecting the maximum value of the wheel deceleration; second deceleration period measurement means for starting to measure the lapse of a period from the time when the maximum value of the wheel deceleration has been detected, and for outputting information on the second deceleration period; and increasing amount calculation means for finding a control amount required to increase the braking force, based on the information on the first deceleration period and on the information on the second deceleration period, and for outputting the required control amount to the braking force adjusting means.

In accordance with the present invention, an amount of increase in the brake pressure which is applied just after decreasing the brake pressure was stopped can be given at proper value by measuring two kinds of pressure-decreasing operation period based on the information on the first deceleration period where the pressure-decreasing signal is being outputted, and on the second deceleration period information concerning the lapse of a period from the time when the maximum value of the wheel deceleration has been detected. The present invention can compensate for a lag in operation of the braking device at the time of completion of the pressure-decreasing operation irrespectively of load conditions of the braked wheel.

As a result, an effective braking force can be rapidly obtained without giving vibration to the vehicle, thereby to offer an advantage in that the distance required to stop the vehicle by braking can be shortened.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Now, the present invention will be described in detail with reference to a preferred embodiment illustrated in the accompanying drawings.

Figure 1:
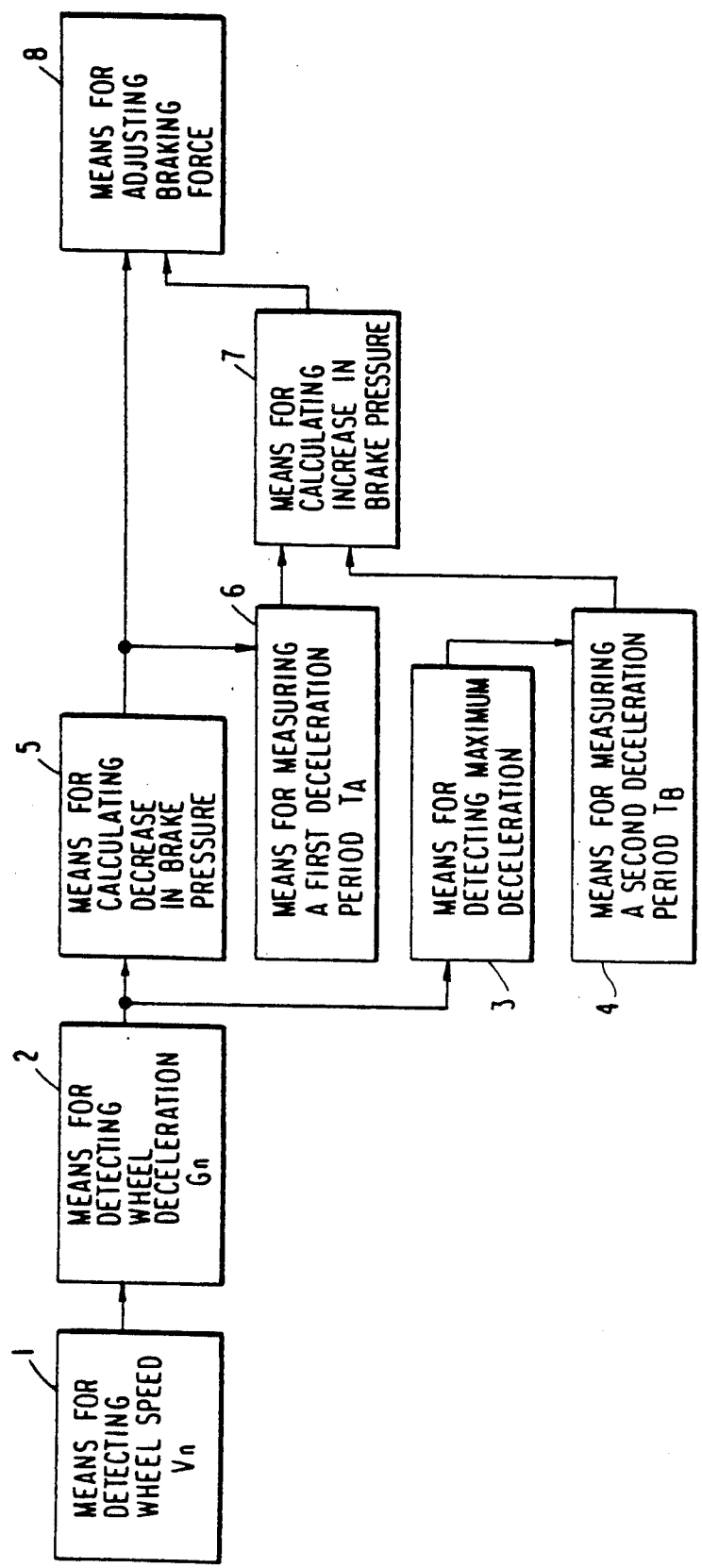
FIG. 1 is a block diagram showing the structure of an embodiment of the antiskid brake control system according to the present invention.

FIG. 1 is a block diagram showing the structure of an embodiment of the antiskid brake control system according to the present invention. As shown in FIG. 1, the embodiment is constituted by means 1 for detecting vehicle wheel speed, means 2 for detecting vehicle wheel deceleration, means 3 for detecting the maximum deceleration of the vehicle wheel deceleration, means 4 for measuring a second deceleration period, means 5 for calculating the amount of a required decrease in the brake pressure, means 6 for measuring a first deceleration period, means 7 for calculating the amount of a required increase in the brake pressure, and means 8 for adjusting a braking force. The vehicle wheel speed detecting means 1 outputs information $V_n$ on the vehicle wheel speed, which is in turn inputted to the vehicle wheel deceleration detecting means 2. The vehicle wheel deceleration detecting means 2 finds acceleration/deceleration at each given period $T_E$, and outputs information $G_n$ on vehicle wheel deceleration.

The information $G_n$ on the vehicle wheel deceleration from the vehicle wheel deceleration detecting means 2 is inputted to the maximum deceleration detecting means 3 where the maximum value of the vehicle wheel deceleration information $G_n$ is detected.

The measurement means 4 measures the time $T_B$ required for the vehicle wheel deceleration information $G_n$ to lower from the maximum value to a given value a or less, and outputs the time $T_B$ as a second deceleration time information to the calculation means 4 for calculating the amount of a required increase in the brake pressure.

The vehicle wheel deceleration information $G_n$ which is outputted from the vehicle wheel deceleration detecting means 2 is also inputted to the calculation means 5 for calculating the amount of a required decrease in the brake pressure.

The calculation means 5 calculates a decrease in the brake pressure which is required for the vehicle wheel deceleration information $G_n$ to lower from the given value a or above to the given value a or less, and outputs a signal indicative of the required decrease in the brake force to the brake force adjusting means 8 and the measurement means 6 for measuring a first deceleration period $T_A$.

The measurement means 6 measures the period wherein the brake pressure-decreasing signal is being outputted, and outputs the measured period as the first deceleration period information $T_A$ to the calculation means 7 for calculating an amount of a required increase in the brake pressure.

The calculation means 7 calculates, based on the first deceleration period information $T_A$ and the second deceleration period information $T_B$, the amount $T_C$ of a required increase in the brake pressure which is required just after decreasing the brake pressure was stopped. The measurement means 7 outputs a signal indicative of the required increase in the brake pressure to the braking force adjusting means 8.

The braking force adjusting means 8 increases and decreases the braking force to applied to the wheel, depending on the signals from the decreasing amount calculating means 5 and the increasing amount calculating means 7.

Next, the embodiment will be explained in more detail with reference to FIG. 2.

Figure 2A:
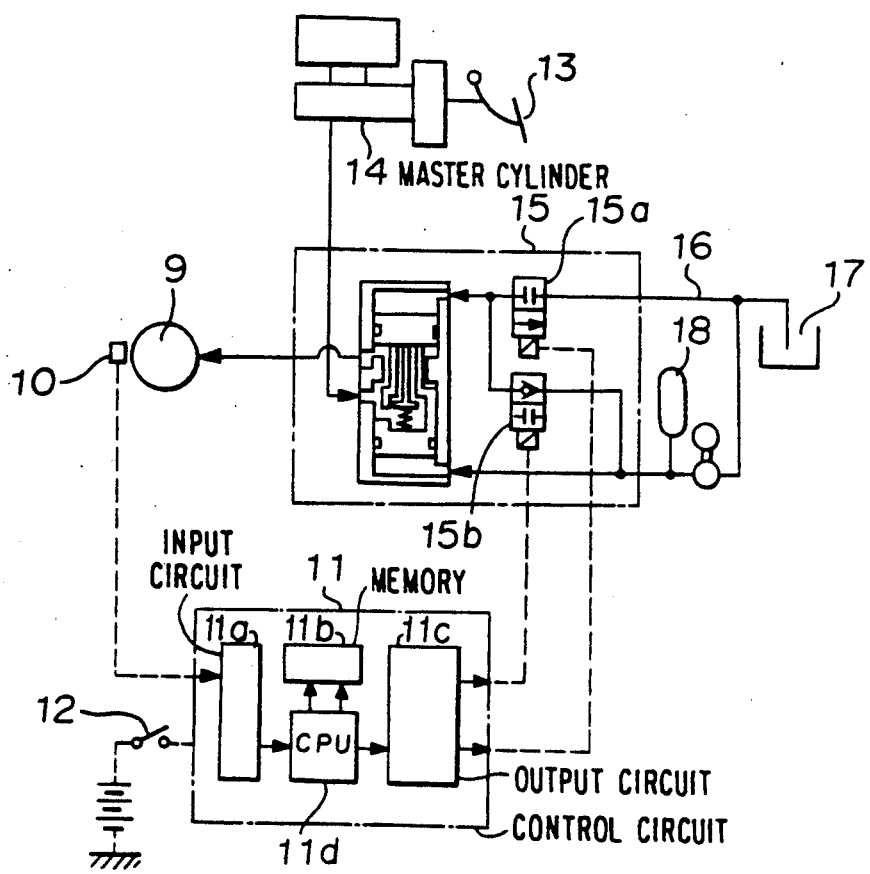
FIG. 2(a) is a block diagram showing the structure a specific embodiment of the antiskid brake control system of the invention.

FIG. 2(a) is a block diagram showing the structure of the specific embodiment. Explanation on only one wheel will be made for the sake of simplicity.

In FIG. 2(a), reference numeral 9 designates a wheel brake. Reference numeral 10 designates a wheel speed sensor which is arranged to detect the wheel speed. Reference numeral 11 designates a control circuit.

The control circuit 11 is provided with power through a power source switch 12, and is constituted by an input circuit 11a which receives a signal from the wheel speed sensor 10, a memory 11b which comprises a ROM with an instruction program stored in it, and a RAM, an output circuit 11c which outputs a control signal, and a CPU 11d which operates in accordance with an instruction program stored in the memory 11b, and outputs the results of the operation to the output circuit 11c.

The braking force is transmitted to the wheel brake 9 through a master cylinder 14 and through a braking force adjusting actuator 15 when a driver presses a brake pedal 13 under normal conditions.

The operation which is made under antiskid conditions will be described in detail with reference to FIG. 2(b) which is an enlarged view of the braking force adjusting actuator 15.

The pressure in a chamber 15c and the pressure in a chamber 15d of the actuator 17 are kept at the same level under normal conditions, and a cut valve 15e of the actuator is therefore pushed by a piston 15f of the actuator to be opened.

When a signal indicative of a decrease in the braking force is outputted from the control circuit 11, a solenoid valve 15a for pressure-decreasing operation and a solenoid valve 15b for pressure-holding operation are both operated to release the pressure in the chamber 15c to a reserver 17 through a conduit 16.

Figure 2B:
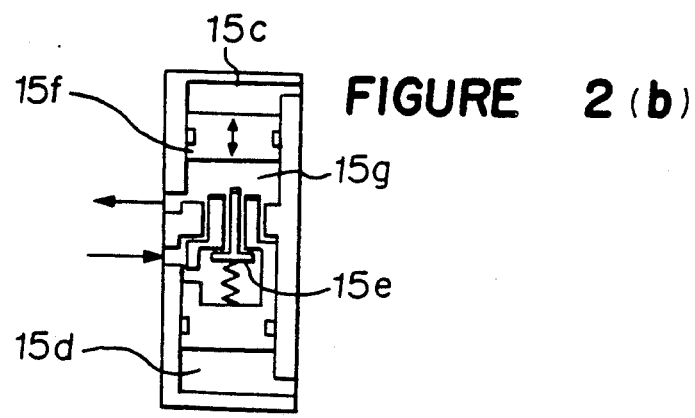
FIG. 2(b) is an enlarged sectional view showing the braking force adjusting actuator shown in FIG. 2(a)

As a result, the piston 15f is shifted upward in FIG. 2(b) to close the cut valve 15e, causing the communication between the master pressure and the wheel pressure to be cut off, and the volume in the chamber 15g to expand. Thus, the braking force is decreased.

When the control circuit 11 outputs a signal indicative of an increase in the brake pressure, both the solenoid valve 15a and the solenoid valve 15b are made inoperative causing a pressure to enter the chamber 15c by the combination of a pump motor and an accumulator 18 as a power source, the pump motor and the accumulator maintaining a high pressure. Thus, the piston 15f is shifted downward in FIG. 2(b) to decrease the volume in the chamber 15g, causing the braking force to be increased.

Next, when the control circuit 11 outputs a signal indicative of holding the pressure, the solenoid valve 15a for pressure-decreasing operation is made inoperative while only the solenoid valve 15b for pressure-holding operation is operated. As a result, the movement of the piston 15f is stopped to hold the braking force.

As explained, the system according to the present invention has such functions that the operations of decreasing the pressure, holding the pressure and increasing the pressure are repeated in accordance with signals from the control circuit 11 to adjust the braking force, thereby preventing the wheel to be locked.

Figure 3:
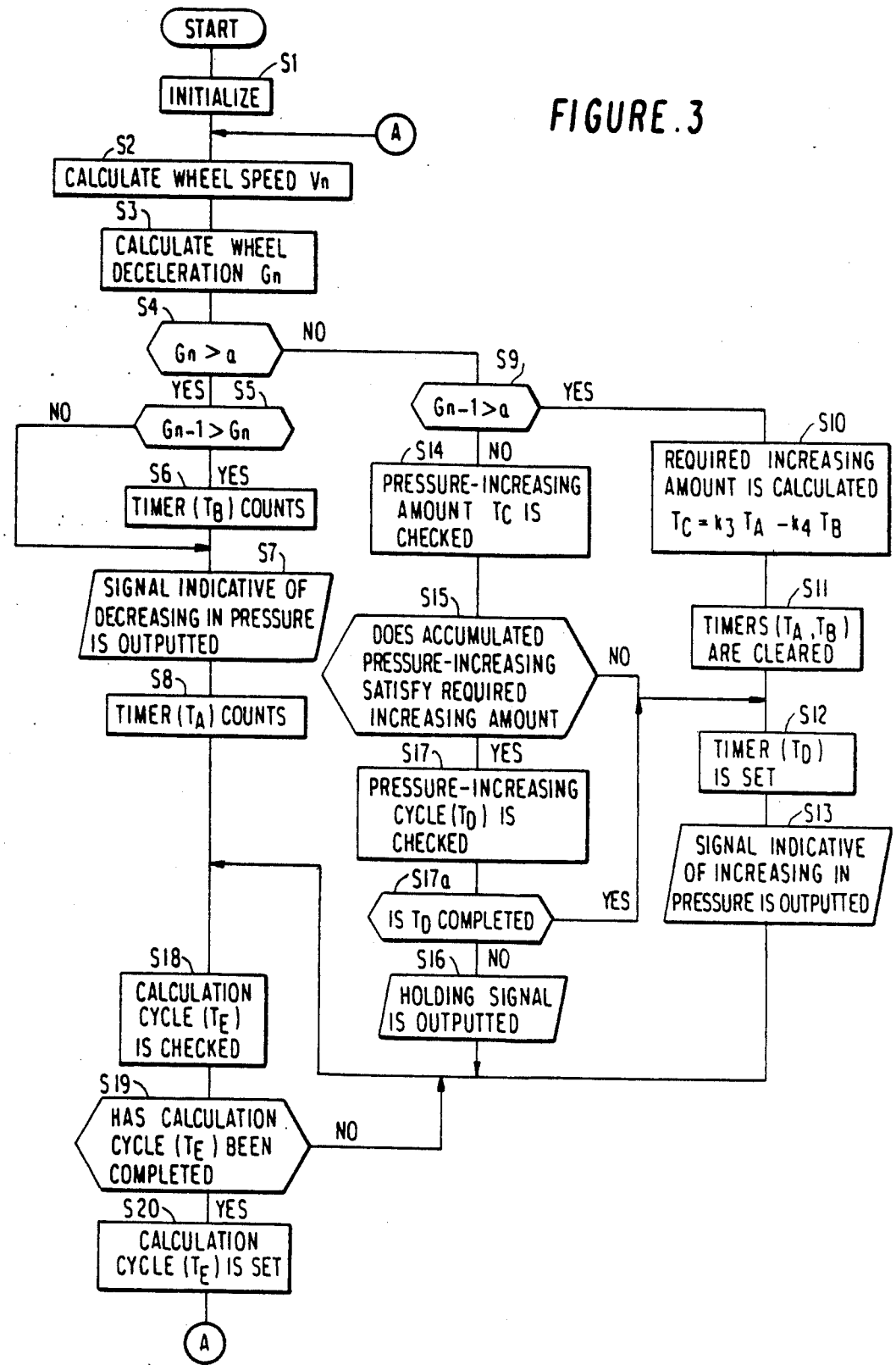
FIG. 3 is a flowchart showing the operation of a CPU incorporated in the control circuit shown in FIG. 2(a)

Next, the operation of the CPU 11d in the control circuit 11 will be explained with reference to the flowchart of FIG. 3.

When the operation of the CPU starts, the memory 11b comprising the RAM and so on, the input circuit 11a and the output circuit 11c and others are initialized at a step S1. At a step S2, the wheel speed $V_n$ is calculated.

As the calculation manner to find the wheel speed $V_n$, e.g. a periodic measurement can be applied. In the periodic measurement, in accordance with the following expression wherein $k_1$ is a constant, the wheel speed $V_n$ is found based on the number $V_n$ of the pulses corresponding to the wheel speed which have been inputted in the certain period $T_E$:

$$V_n = k_1 \times \frac{P_n}{T_E} \quad (1)$$

At the next step S3, the wheel deceleration $G_n$ is calculated. In the calculation of the wheel deceleration, the wheel deceleration is found based on the control cycle $T_E$ of the CPU 11d, the wheel speed $V_{n-1}$ in the preceding control cycle, and the wheel speed $V_n$ in the present control cycle, in accordance with the following expression:

$$G_n = k_2 \times \frac{V_{n-1} - V_n}{T_E} \quad (2)$$

In the expression, the inequality, $Gn > 0$, means deceleration, the inequality, $Gn < 0$, means acceleration, and $k_2$ is a constant.

At the next step S4, it is checked whether the inequality, $G_n > a$ holds or not. If affirmative, the process proceeds to a step S5 where the maximum value of the wheel deceleration $G_n$ is detected, and the process proceeds to a step S6 where the time required for the wheel deceleration $G_n$ to lower from the maximum value to the given value a is measured by a timer $T_B$.

Unless the wheel deceleration $G_{n-1}$ in the preceding control cycle is greater than the wheel deceleration $G_n$ in the present control cycle at the step S5, a signal indicative of a decrease in the brake pressure is outputted at a step S7, and a decreasing signal outputting period $T_A$ is measured at a step S8.

If it is detected at the step S4 that the wheel deceleration $G_n$ is not greater than the given value a, the process proceed to a step S9 where the deceleration $G_{n-1}$ in the preceding control cycle is compared to the given value a in order to determine a required increase in the brake pressure after decreasing the brake pressure has been stopped.

If the wheel deceleration $G_{n-1}$ in the preceding control cycle is greater than the given value a, it is judged that it is now just after the decreasing operation of the brake pressure has been stopped, and the required increasing amount $T_C$ is calculated at a step S10. The required increasing amount $T_C$ is calculated in accordance with the following expression;

$$T_C = k_3 \times T_A - k_4 \times T_B \quad (3)$$

In the expression, $k_3$ and $k_4$ are constants. As each specific value, $k_3 = 0.5$ and $k_4 = 0.1$ are taken. At this case, $T_C = 0.45 \times T_A$ is obtained in the case of $T_A = 2 \times T_B$.

After calculating the required increasing amount $T_C$ has completed at the step S10, the timers $T_A$ and $T_B$ are cleared at a step S11. At the next step S12, a timer $T_D$ for counting a holding period (pressure-increasing cycle $T_D$) after the completion of the increase in the brake pressure is set. After that, a signal indicative of an increase in the brake pressure is outputted at a step S13.

If it is detected at the step S9 that the vehicle deceleration $G_{n-1}$ is not greater than the given value a, the process proceeds to a step S14 where the pressure-increasing amount $T_C$ that has been obtained just after decreasing the pressure was stopped is accumulated. If it is judged at the next step S15 that the accumulated amount is less than the required pressure increasing amount $T_C$, the process proceeds to the step S12 where the pressure increasing cycle is set, and a signal indicative of an increase in the brake pressure is outputted at the step S13.

If it is judged at the step S15 that the accumulated amount satisfies the required pressure increasing amount $T_C$, the process proceeds to a step S17 where the pressure increasing cycle $T_D$ is checked. If it is detected at a step S17a that the pressure increasing cycle $T_D$ is completed, the process proceeds to the steps S12 and S13 where a signal indicative of an increase in the brake pressure is outputted every the certain pressure increasing cycle $T_D$ under the control of the step S17. If it is detected at the step S17a that the pressure increasing cycle $T_D$ has not been completed, the process proceeds to a step S16 where a holding signal is outputted.

In order to make the calculation cycle constant, the calculation cycle $T_E$ is judged at a step S18. At the next step S19, it is judged whether the calculation cycle $T_E$ has been completed. If the calculation cycle $T_E$ has not been completed, the process returns to the step S18. If the calculation cycle $T_E$ has been completed, the process proceeds to a step S20 where the calculation cycle $T_E$ is set, and the process is returned to the step S2. In this way, the calculation is executed every certain period.

Figure 4A:
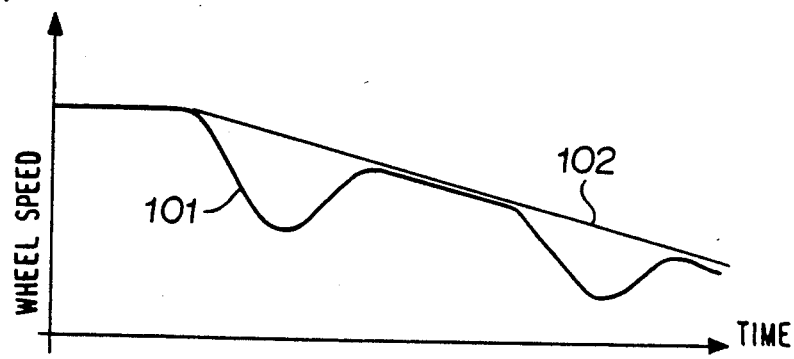
FIGS. 4(a), 4(b), 4(c) and 4(d) are characteristic curve to help explain the operation of the invention.
Figure 4B:
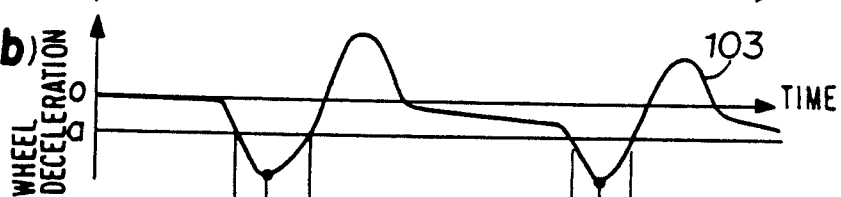

Now, the operation example of an actual vehicle will be explained with reference to FIG. 4. Suppose that wheel speed has changed with the lapse of time as indicated by 101 in FIG. 4(a). The wheel deceleration changes as indicated by 103 in FIG. 4(b). When the wheel deceleration exceeds the given value a, a signal indicative of a decrease in the brake pressure is outputted, and the brake pressure 104 is therefore lowered as shown in FIG. 4(d). Counting by the timer $T_A$ starts when the decreasing signal is outputted.

When the brake pressure 104 is lowered, the wheel speed 101 starts to be revived, and the wheel deceleration 103 therefore lesseus. Counting by the timer $T_B$ starts when it is detected that the wheel deceleration 103 has achieved the maximum value.

Figure 4C:
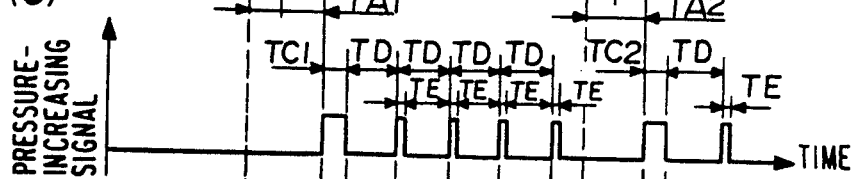
Figure 4D:
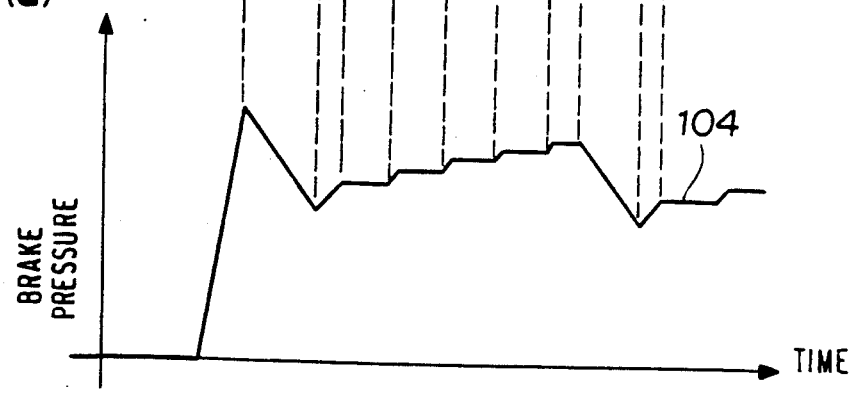
Figure 5:
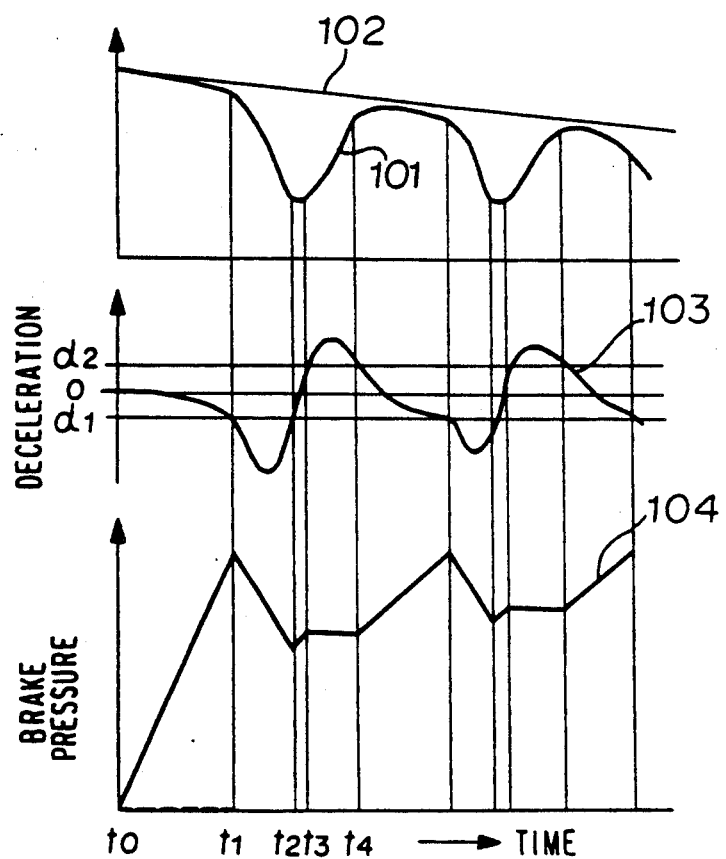
FIG. 5 is a drawing of characteristic curves to help the operation of a conventional antiskid brake control system.

When wheel deceleration achieves not greater than the given value a, outputting the pressure-decreasing signal is stopped, and the required pressure increasing amount $T_C$ which is calculated to compensate for a lag in the braking operation is outputted as indicated in FIG. 4(c).

After that, a pressure-holding output signal and a pressure-increasing output signal are outputted at a certain cycle, causing the brake pressure to be gradually increased. Then a decreasing signal is outputted. Such operations are repeated to obtain the vehicle speed 102 as indicated in FIG. 4(a).

Obviously, numerous modifications and variations of the present invention are possible in light of the above teachings. It is therefore to be understood that within the scope of the appended claims, the invention may be practiced otherwise than as specifically described herein.

What is claimed is:

1. An antiskid brake control system comprising:
    braking force adjusting means for decreasing and increasing a braking force to be applied to at least one wheel so that the wheel is prevented from being locked at the time of braking a vehicle with the braked wheel;
    wheel speed detecting means for detecting the speed of the wheel to which the braking force is applied;
    wheel deceleration detecting means for detecting acceleration/deceleration of the wheel to output information on the deceleration of the wheel;
    decreasing amount calculation means for receiving the information on the vehicle deceleration, and for outputting a signal indicative of a decrease in the braking force to the braking force adjusting means when detecting a tendency of the wheel to lock wherein the wheel deceleration exceeds a given value;
    first deceleration period measurement means for measuring the period where the pressure-decreasing signal is being outputted, and for outputting information on the first deceleration period;
    maximum deceleration detecting means for detecting the maximum value of the wheel deceleration;
    second deceleration period measurement means for starting to measure the lapse of a period from the time when the maximum value of the wheel deceleration has been detected, and for outputting information on the second deceleration period; and
    increasing amount calculation means for finding a control amount required to increase the braking force, based on the information on the first deceleration period and on the information on the second deceleration period, and for outputting the required control amount to the braking force adjusting means.

* * * * *